United States Patent [19]

Charles

[11] 3,744,716
[45] July 10, 1973

[54] THERMAL MODULATION OF AIR SUPPLY SYSTEM IN AUTOMOTIVE VEHICLE

[75] Inventor: Herbert N. Charles, Chatham, Ontario, Canada

[73] Assignee: Fram Corporation, East Providence, R.I.

[22] Filed: Nov. 22, 1971

[21] Appl. No.: 200,926

[52] U.S. Cl........... 236/87, 123/122 D, 123/122 H, 236/101 E
[51] Int. Cl....................... F02m 31/02, B01d 39/10
[58] Field of Search............... 123/122 D, 122 H, 123/117 A; 236/87; 137/468

[56] References Cited
UNITED STATES PATENTS 3,638,625   2/1972   Jaimee............................ 123/122 H
3,513,817   5/1970   Kearsley........................ 251/615 X
2,231,211   4/1941   Halsey et al..................... 137/468
3,459,163   8/1969   Lewis............................... 236/87 X
1,944,396   1/1934   Berry............................ 123/122 H Primary Examiner—William F. O'Dea
Assistant Examiner—Peter D. Ferguson
Attorney—Robert E. Hillman

[57] ABSTRACT

Temperature sensor for controlling air pressure in vacuum control line for thermally modulated air supply system in an automotive vehicle, featuring a temperature responsive element isolated from the atmosphere except through the control orifice and the air line in which pressure is being controlled; a free floating valve element supported against the control orifice from beneath by a bimetal strip, so that movement of the strip away from the orifice enlarges its effective opening; and a valved orifice-defining member adjustable toward and away from the bimetal strip for calibration.

5 Claims, 3 Drawing Figures

PATENTED JUL 10 1973 3,744,716
FIG 1
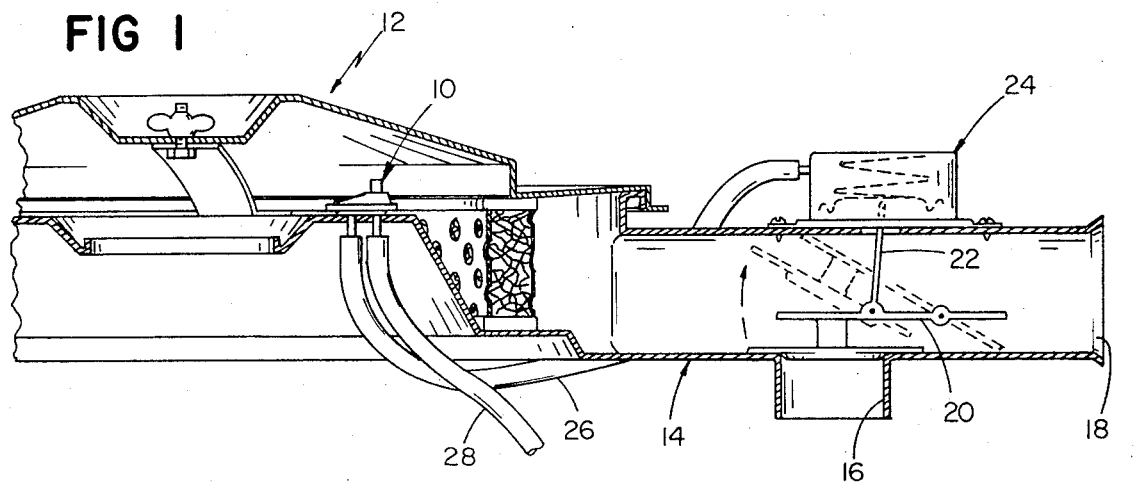
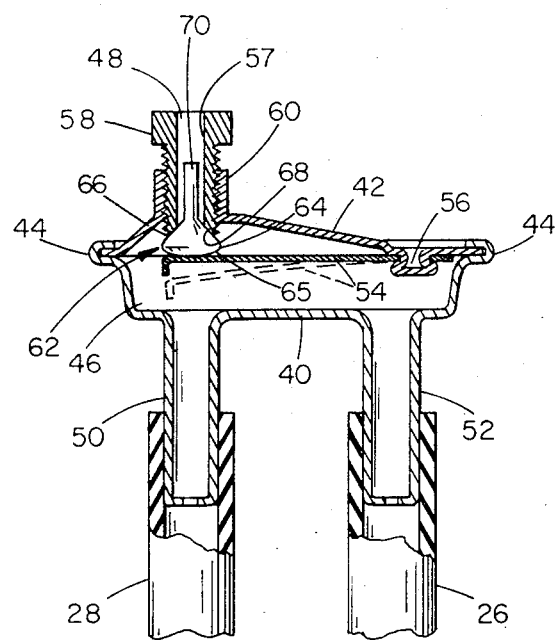
FIG 2
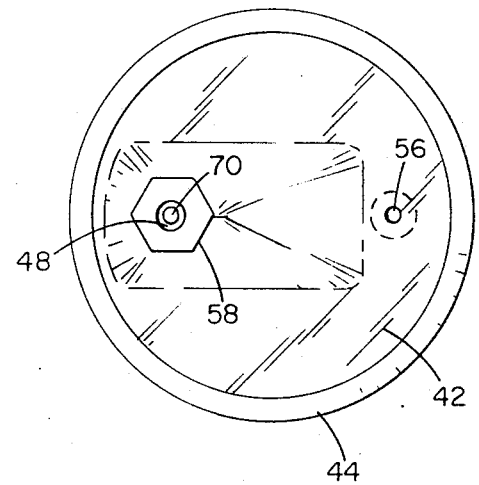
FIG 3

3,744,716

THERMAL MODULATION OF AIR SUPPLY SYSTEM IN AUTOMOTIVE VEHICLE

BACKGROUND OF THE INVENTION

1. Field of the Invention

This invention relates to a temperature sensitive device used to control air pressure in a vacuum control line for a thermally modulated air supply system in an automotive vehicle.

2. Description of the Prior Art

The invention is an improvement on the temperature sensor disclosed in U.S. Pat. No. 3,513,817, where a poppet valve hanging from a bimetal strip meters a control orifice to the atmosphere.

SUMMARY OF THE INVENTION

The sensor of the invention is low cost, rugged (e.g., with the temperature responsive element protected from any corrosive environment), maintenance free (e.g., with minimized danger from contamination buildup at the control orifice and its valve), and easily and accurately calibrated.

In general, the invention features, in its various aspects, a temperature responsive element isolated from the atmosphere except through the control orifice and the air line in which pressure is being controlled; a free floating valve element supported against the control orifice from beneath by a bimetal strip, so that movement of the strip away from the orifice enlarges its effective opening; and a valved orifice-defining member adjustable toward and away from the bimetal strip for calibration.

Other advantages and features of the invention wqll be apparent from the description and drawings herein of a preferred embodiment thereof.

BRIEF DESCRIPTION OF THE DRAWINGS

FIG. 1 is a side elevation, partly in section, of an automobile air cleaner system embodying the invention;

FIG. 2 is a vertical sectional view of the temperature sensor shown generally in FIG. 1; and FIG. 3 is a plan view of the temperature sensor.

DESCRIPTION OF THE PREFERRED EMBODIMENT

Referring to FIG. 1, temperature sensor 10 is mounted in conventonal air cleaner 12 fed by air conduit 14 with hot and cold air inlets 16 and 18, respectively. Valve door 20 is positioned by hook 22, in turn under control of vacuum motor 24, to determine the relative effective openings of inlets 16 and 18 and hence the mixture of hot and cold air reaching the air cleaner. Vacuum is supplied to motor 24 from the engine intake manifold through lines 26 and 28. Sensor 14 is inserted between lines 26 and 28 to control the pressure in line 26 and hence in motor 24. Except for the construction and operation of sensor 10, the system is identical to that described in detail in the patent identified above, the disclosure of which is hereby incorporated by reference.

Referring to FIGS. 2 and 3, sensor 10 has a body 40 and a cap 42 clinched together at 44 around their peripheries to define a pressure chamber 46 open only through pressure control orifice 48 and tubes 50 and 52 to which are respectively connected lines 28 and 26. Bimetal strip 54 in chamber 46 is fixed to cap 42 at 56 and extends to beneath orifice 48. The strip deflects away from orifice 48 as temperature increases. Orifice 48 is defined by axial bore 57 in screw 58 threaded in collar extension 60 of cap 42. Free floating valve 62 has a base 64, with a slightly convex bottom surface 65 resting loosely on strip 54, and an upper frusto-conical surface 66 which matches a bevelled surface 68 on screw 58 at the mouth of orifice 48; and a stem 70 which extends into bore 57 and has an O.D. about half the I.D. of the bore.

In operation, screw 58 is rotated to calibrate the sensor by positioning surface 68, in turn determining the effective openings through orifice 48 for a given position of strip 54 and valve 62 resting thereupon. As air temperature increases, srip 54 deflects downwardly, increasing the opening through orifice 48. Decreases in air temperature correspondingly reduce the opening through orifice 48. In turn, the size of the opening through orifice 48 determines the degree to which the vacuum in line 28 is dissipated in chamber 46, and hence the pressure in line 26 and the position of door 20, as described in the patent identified above.

The location of strip 54 in chamber 46 protects it from any corrosive environment (especially if orifice 48 is vented by piping, not shown, to a non-corrosive zone) or other sources of damage. Since valve 62 is free to move around, it will free itself of any buildup of contaminant at the mouth of orifice 48.

Other embodiments are within the followng claims:

I claim:

1. In a vacuum control system for a thermally modulated air supply system in an automobile, said system having a vacuum line, a device for controlling air pressure in said vacuum line in said system in response to tempeature changes, comrpising a housing defining a pressure chamber connected to said line in which pressure is to be controlled, and having a control orifice, a temperature sensitive element mounted inside said chamber beneath said orifice, and a free floating valve mounted inside said chamber and arranged to determine the effective opening through said orifice in response to changes in the state of said element said valve having a base resting loosely upon said element and a stem extending upwardly from said base and loosely into said orifice, said stem having an O.D. smaller than the I.D. of said orifice and thereby being freely movable in said orifice.

2. The device of claim 1 in an air cleaner, wherein said housing is mounted in said air cleaner.

3. The device of claim 1 wherein said orifice is defined by a cylindrical bore in a member mounted in a wall of said chamber.

4. The device of claim 3 wherein said member is threaddedly adjustable with respect to said wall for movement toward and away from said strip, to thereby determine the degree to which said stem extends into said bore for a given position of said strip.

5. The device of claim 4 wherein said member has a cylindrical bore defining said orifice, with a bevelled surface at one end of said bore adjacent said valve, and said valve has a base with an upper frusto-conical surface matching said bevelled surface and a stem extending upwardly from said surfaces into said bore in all positions of said valve.

* * * * *